Patented Apr. 3, 1923.

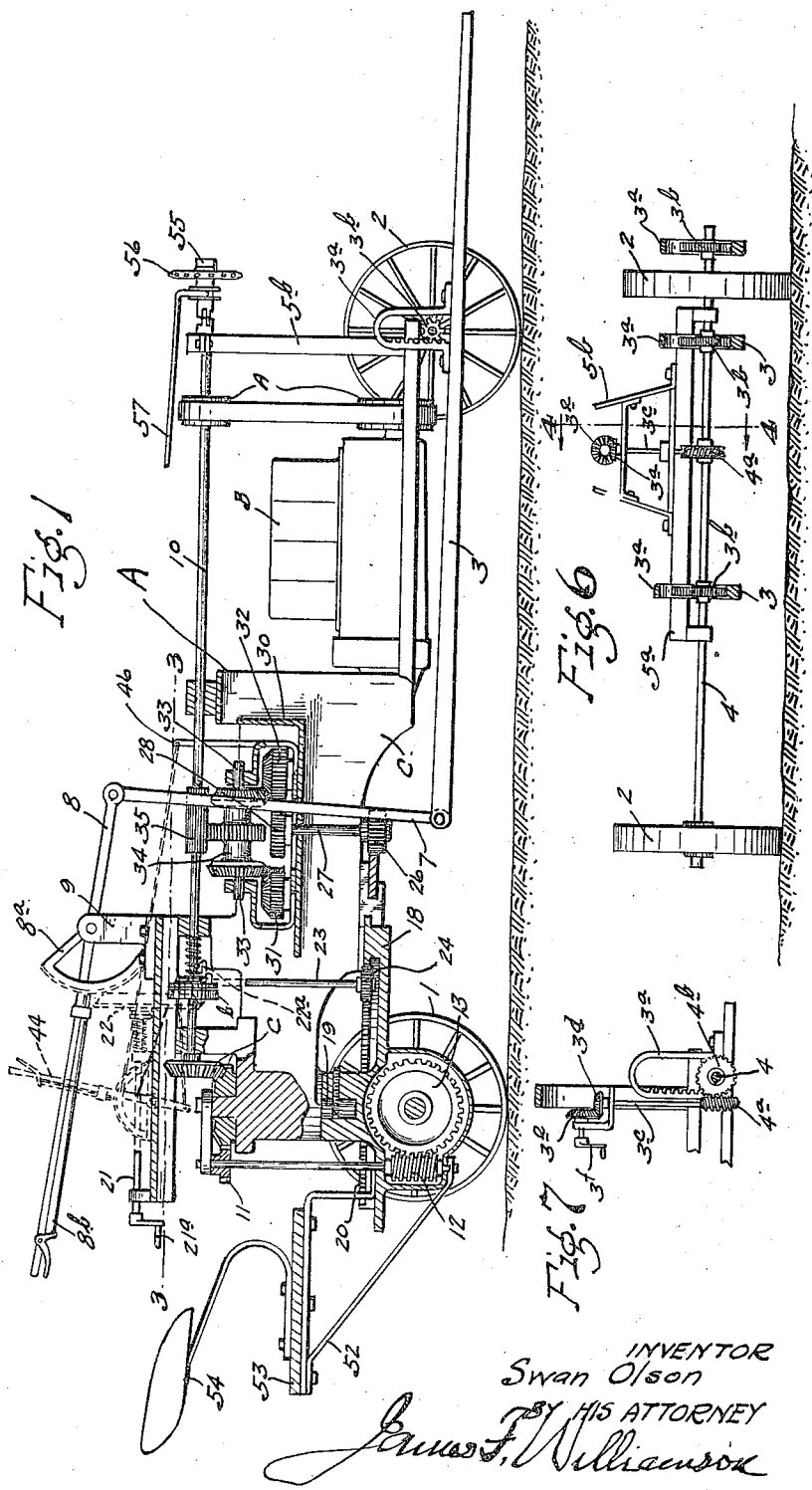

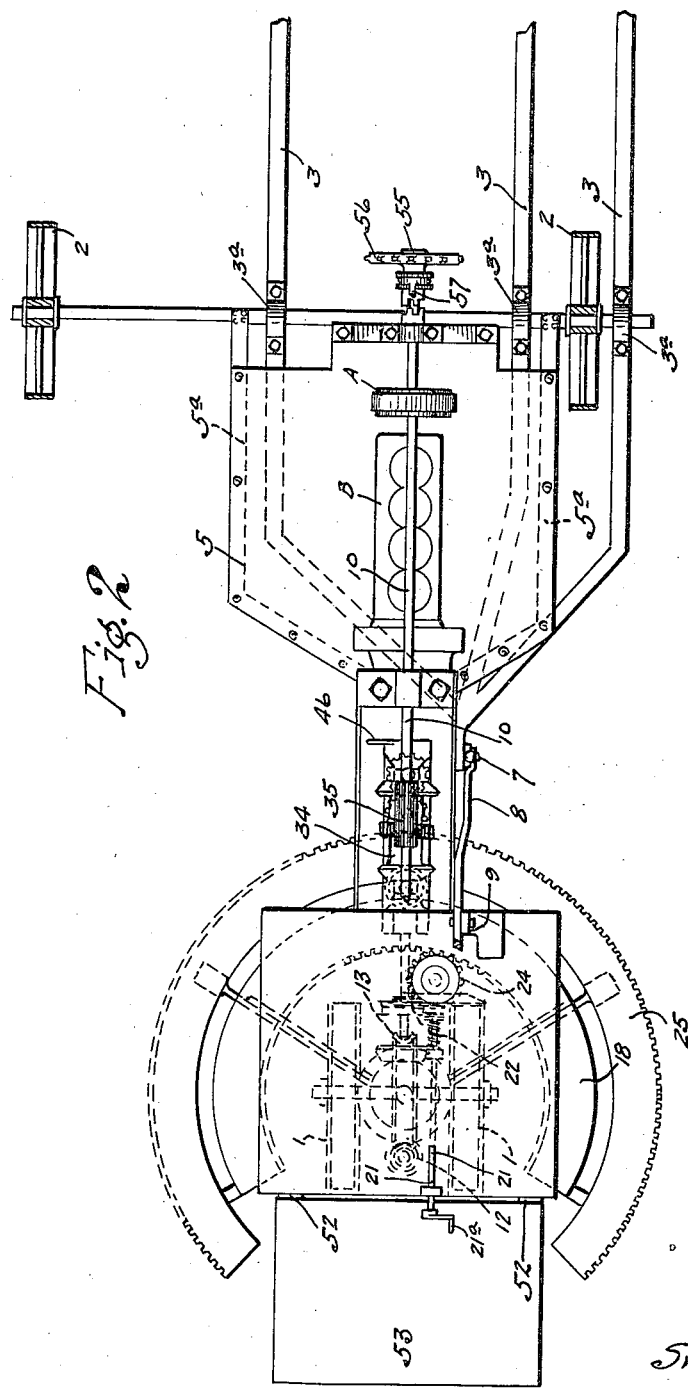

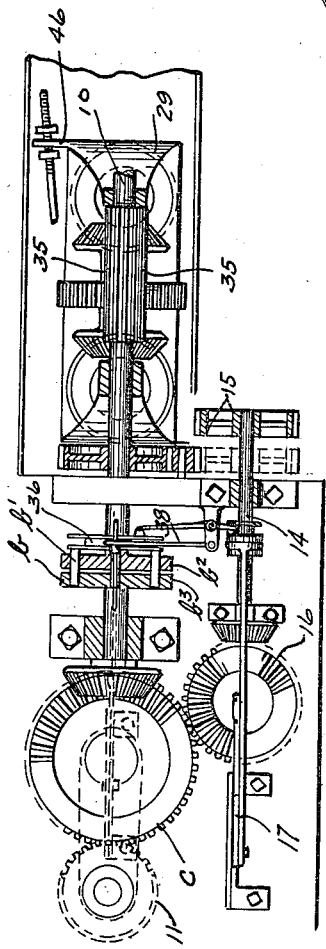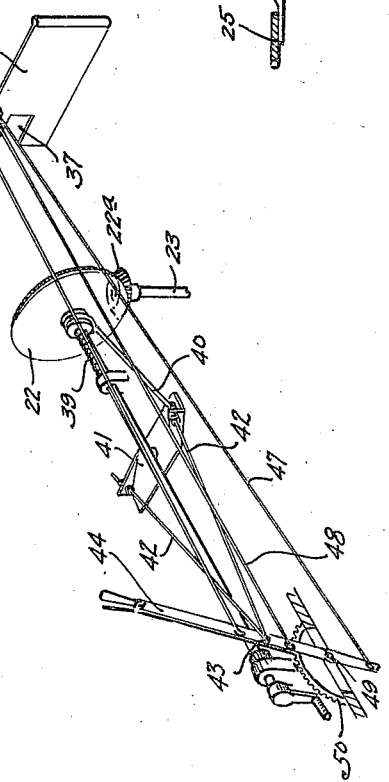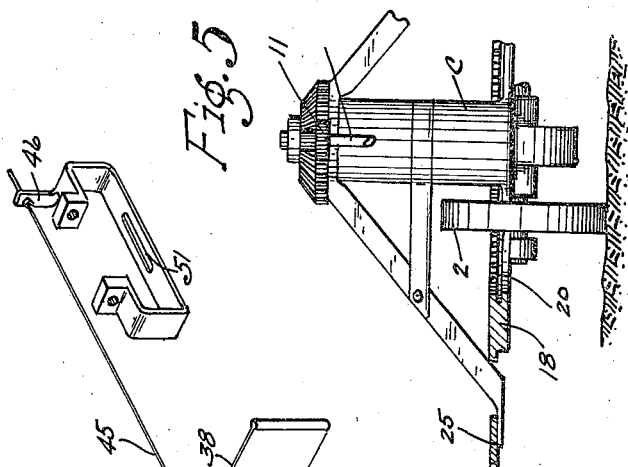

1,450,384

UNITED STATES PATENT OFFICE.

SWAN OLSON, OF MINNEAPOLIS, MINNESOTA.

PUSH-HARVESTER BINDER.

Application filed February 17, 1921. Serial No. 445,839.

*To all whom it may concern:*

Be it known that I, SWAN OLSON, a citizen of the United States, residing at Minneapolis, in the county of Hennepin and State of Minnesota, have invented certain new and useful Improvements in Push - Harvester Binders; and I do hereby declare the following to be a full, clear, and exact description of the invention, such as will enable others skilled in the art to which it appertains to make and use the same.

This invention relates to a harvester machine, and particularly to the type known as a "header," and the invention is directed to the means for driving and controlling said harvester or binder. It is customary to have the driving and propelling means for such a harvester located behind the same and the harvester is thus pushed ahead of the driving means into operative relation to the grain to be harvested.

It is an object of this invention to provide a driving and controlling device which, in addition to furnishing the propelling power for the harvester and the means to drive the various parts thereof, is also provided with means whereby the same can be quickly and conveniently turned at the corners of the plot of grain being cut.

It is a further object of this invention to provide the driving element of the harvester with means whereby the driving or bull wheel of the same will be turned to effect the movement at the corners of the grain plot and to furnish a controlling means whereby this means for turning the bull wheels will be thrown into operation and the propelling mechanism and steering mechanism for said wheels will be simultaneously thrown out of operation.

These and other objects and advantages of the invention will become apparent from the following description made in connection with the accompanying drawings, in which Fig. 1 is a view in side elevation of the driving element in a push harvester or binder, certain parts thereof being shown in section;

Fig. 2 is a somewhat diagrammatic plan view of the driving element and connections to the harvester;

Fig. 3 is a horizontal section taken substantially on the line 3—3 of Fig. 1:

Fig. 4 is a perspective view on an enlarged scale of the controlling connections for the various parts of the transmission;

Fig. 5 is a partial rear view of the driving means as seen from the left of Fig. 1, certain parts being broken away;

Fig. 6 is a view in front elevation as seen from the right of Fig. 1, certain parts being shown in section; and Fig. 7 is a sectional view taken substantially on the line 7—7 of Fig. 6.

Referring to the drawings, the driving means for the binder or harvester is designated generally as A and comprises a motor B and transmission mechanism carried upon a suitable frame structure C which is supported upon the driving or bull wheels 1 at the rear end and upon the caster wheels 2 at the front end. The binder proper is supported upon the beams 3 which extend longitudinally of the device and are adjustably supported on the shaft 4 which connects the caster wheels 2. The motor platform 5 is supported upon spaced beams $5^a$ fixed at their front ends to the motor shaft 4. It will be noted that the caster wheels are mounted for rotation upon this shaft.

The beams 3 extend rearwardly to a common point and are joined in a suitable way to a projecting member which is pivoted to the upwardly extending link 7, which link is pivoted at its upper end to the end of a lever 8, which lever extends rearwardly therefrom and is pivoted at its intermediate ends to an upstanding lug 9 secured on the frame C. The lever 8 is provided with the usual notched quadrant $8^a$, and a spring pressed pawl mechanism $8^b$ having a grip portion located at the end of the lever whereby the lever can be swung on its intermediate pivot point to raise or lower the links 7 and beams 3 and can be held locked in any desired position. The beams 3 are arranged to swing about the shaft 4 as a pivot, and by thus manipulating the lever 8, the binder platform can be raised and lowered in the customary way. The members 3 are provided with upwardly extending U-shaped bearings $3^a$ bolted thereto, which bearings are formed as a rack at the inner portion of one of their sides, and small gears $3^b$ are secured to the shaft 4 in position to be located in said bearings $3^a$ and to mesh with the said rack portions thereof. A standard $5^b$ at the front of the motor platform is arranged with a suitable cross piece to form a bearing for an upwardly extending shaft $3^c$ having on its upper end a small pinion $3^d$ bearing upon said cross piece at its lower end and arranged to mesh with another beveled gear $3^e$ mounted upon a shaft supported in a member rising from the said cross piece and extending rearwardly a short distance where it is provided with a crank member $3^f$. The lower end of the shaft $3^e$ carries a worm gear $4^a$ which is arranged to mesh with a worm wheel gear $4^b$. It will thus be seen that by turning the crank $3^f$, the worm and worm wheel gear will be turned to turn the shaft 4 which will rotate the gears $3^b$ and thus raise or lower the rack members on bearings $3^a$. In this manner the binder platform can also be raised or lowered at its pivot point.

The power for the driving element is furnished by the motor B and is transmitted through belt carrying pulleys $a$ to the driving shaft 10. To turn the wheels for moving the driving member the power is transmitted through a clutch $b$ and the beveled gears $c$ through a small spur gear 11 to the worm gear 12 which is arranged to mesh with and drive the worm wheel gear 13 secured to the driving axle. A reversing gear train is illustrated in Fig. 3 comprising an auxiliary shaft 14 connected through gears 15 to the driving shaft 10, which auxiliary shaft drives a pair of gears 16, the lower one of which is arranged to mesh with the horizontal beveled gear $c$. The shaft 14 is equipped with suitable shifting mechanism designated generally as 17, by which one of the gears 15 is moved forwardly out of mesh when the reversing mechanism is not in operation.

The rear axle housing and frame 18, it will be noted, is pivotally connected to the frame C at 19, and this housing has a horizontally extended portion or flange which is equipped with an internal gear 20. A hand steering mechanism is provided which includes the shaft 21 equipped with a hand crank $21^a$, which shaft is connected by a pair of beveled gears indicated as 22 and $22^a$ (see Fig. 4), and a shaft 23, to the lower end of which a spur pinion 24 is secured and arranged to mesh with the gear 20. It will be seen that by turning the crank $21^a$, the gear 20 will be turned to swing the driving shaft and the bull wheels 1 about the vertical axis of the pivotal connection 19, and will thus change the direction of travel of the driving device. The bull wheel and axle frame 18 is provided with a large annular gear 25 which surrounds the portion carrying the gear 20 and is secured thereto by radially extending arms through which may pass suitable bolts or rivets. The gear 25 is equipped with gear teeth on its exterior circumference and the pinion 26 is adapted to engage these teeth, which pinion is carried on a shaft 27 extending vertically through the frame C which forms the bearing therefor and has secured to its upper end a spur gear 28.

A sliding carriage or gear box 29 is provided and adapted for sliding movement in a box-like portion 30 of the frame C, and gears 31 and 32, having their side surfaces formed as spur gears and their upper surfaces formed as beveled gears, are suitably disposed in said carriage to rotate about a vertical axis, and as shown, are located at each side of and spaced from the gear 28. A carriage 29 is provided with upwardly extending portions which form spaced bearings for the shaft 33 which carries between said bearings a member 34 formed at the central portion as a spur gear and at the end portions as oppositely disposed beveled gears. These beveled gears are arranged to be constantly in mesh with the beveled gear portions of the gears 31 and 32. The central gear of the member 34 is arranged to be constantly in mesh with an elongated spur gear keyed or otherwise rigidly secured to the drive shaft 10. The carriage 29 is arranged to be moved forwardly and rearwardly, and it will be noted that when moved forwardly the gear 31 will be brought into mesh with the gear 28 to drive the shaft 27 in one direction, and when the carriage is moved rearwardly the gear 32 will be brought into mesh with the gear 28 to drive the shaft 27 in the opposite direction. The carriage can also be positioned so that neither of the gears 31 or 32 mesh with the gear 28 and shaft 27 and hence the large annular gear 25 will not be moved.

The clutch $b$ disposed near the rear of the drive shaft 10 is of the "pin and disk" type in which the pins $b'$ are adapted to be projected through the disk $b^2$ into the disk $b^3$, the disks $b^2$ and $b^3$ being connected to adjoining sections of the driving shaft 10. The member 36 carrying the pins $b'$ is adapted to be moved longitudinally on the shaft 10 to withdraw pins $b'$ from the disk $b^3$ and said member is arranged as a clutch collar, the central portion of which is engaged in a groove 37 formed in a pivot plate 38 which is pivoted at one end thereof to a lug projecting from the frame C.

The beveled gear 22 (see Fig. 4) forming part of the steering mechanism is urged and maintained in engagement with its mating gear $22^a$ by a strong coiled spring 39 disposed about the shaft 21 and the gear 22 is provided with a clutch collar adjacent its rear face, and in which engages a clutch fork connected to a rod 40 which rod is connected to an upstanding ear at one side of a plate 41 which is pivoted at its center to the horizontal top surface of the frame C shown in Fig. 1. The plate 41 is of rectangular shape and has another ear upstanding therefrom at the corner opposite the ear to which the rod 40 is connected and the said plate is connected by rods 42 extending to both of said ears and converging to a common point 43 where they are pivoted to the intermediate portion to an upstanding lever 44. The lever 44 is arranged to simultaneously operate both the clutch b, the carriage 29 and the steering gear 22 and is, hence, provided with a rod 45 pivoted thereto above the point 43, which rod extends forwardly and is secured by nuts engaging its threaded end, in an upstanding lug 46 on the carriage 29. The plate 38 is also connected to the lever 44 by two rods 47 and 48, which rods are connected to the portion of said plate disposed above the slot 37 by nuts engaging the threaded ends on the rod and the rod 47 is pivotally connected to the lower end of the lever 44, below the pivoted point 49 of said lever, while the rod 48 is pivoted to the said lever 44 at an equal distance above said pivot point 49. The lever 44 is provided with the usual tooth quadrant 50 and the spring pawl carrying lever adapted to be gripped to permit the lever to be swung about the quadrant 50. The carriage 29, as shown in Fig. 4, is provided with a central elongated slot 51 through which passes the shaft 27 carrying at its upper end the gear 28 which will hold the carriage in position for longitudinal movement. The axle gear housing 18 is provided with suitable bracket members 52 sustaining a narrow platform 53 upon which is arranged and secured in any suitable manner a seat 54.

The driving shaft 10, at its front end, is arranged to be clutched to a shaft extension 55 which drives the binder mechanism through a chain connected to a sprocket 56. A rod 57 is adapted to be moved to engage and disengage the shaft extension 55 with the driving shaft 10 by a mechanism not shown, at the rear of the machine which, of course, will be disposed in a convenient relation to the operator.

The driving train of mechanism has already been described as well as the hand steering mechanism. It will be understood from the above description that when the carriage 29 is moved by the lever 44, for instance, in a forwardly direction, the plate 38 will be swung to the right, as seen in Fig. 4 and the clutch b will be disengaged, thus disconnecting the driving or turning mechanism for the bull wheels 1. It may be here stated that the rod 47 has no nut on the front side of the plate. The forward movement of the lever 44 will also swing plate 41 in a clockwise direction and this will result in the rod 40 retracting the gear 22 so that the shaft 21 and the crank 21ᵃ are disconnected from the rest of the steering mechanism. The rod 42 connects the lever to the plate 41 and the nut on the front side of the plate is at some distance therefrom and only the rod 42 functions when the lever is swung forwardly. The carriage 29 being moved forwardly, the gear 31 is brought into engagement with the gear 28 and through the train of mechanism described, the larger gear 25 is turned. The axle will therefore be turned about a central vertical axis and this movement will continue until the wheels are turned approximately ninety degrees when the lever 44 will be swung in the opposite direction. The above described movement of lever 44 is given when the binder has come to a corner of the grain plot. The driving mechanism which is pushing the binder, will at that time be directly behind the same and parallel with the side of the grain plot just cut. The driving or bull wheels now being swung in a right angle, as above described, and lever 44 will be moved to the rear to bring the parts again into the position shown in Fig. 1 and the drive from shaft 10 will be again transmitted to turn the wheels. The wheels will now move the driving mechanism laterally and the front part of the driving mechanism and the binder being stationary, the wheels will simply travel in an arc of a circle, the center of which is approximately directly beneath the right hand caster wheel 2. This is the wheel shown at the bottom of Fig. 2. In the actual construction of the machine, this wheel will be located as nearly as possible to the longitudinal center of the driving device and this end will be held practically stationary while the rear end of the device moves thereabout. When the device has swung through ninety degrees or substantially a quadrant, the longitudinal center thereof will then be brought into parallelism with the next side of the grain plot to be cut. The lever 44 will now be swung rearwardly and the clutch b and the steering mechanism again disengaged and the gear 32 brought into mesh with gear 28 which will swing the large gear 25 in the opposite direction to that above described and the wheels 1 will again be brought into parallelism with the longitudinal center of the machine. This lever 44 will now be swung again to position shown in Fig. 1 and the binder and the device will now be in position to travel along the next side of the grain plot.

It will thus be seen that applicant has provided a simple and efficient driving mechanism, by which the push harvester can be easily and quickly turned about the corners of the grain plot and the driving mechanism be quickly brought into alignment therewith. The parts of the transmission mechanism are simple and easily assembled and will require very little attention to maintain the same in perfect operative condition. It will be understood that, if desired, various gear housings, covers or shields may be placed over the various gears used to prevent the accumulation of dust and dirt thereon and to avoid the possibility of injury to the operator. It will also be noted that the controller for all of the movements of the device are brought within convenient reach of the operator and he can continue to operate the machine through its various positions while maintaining his position in the seat at the rear thereof.

It will, of course, be understood that various changes may be made in the form, details and arrangement of the device without departing from the scope of applicant's invention, which, generally stated, consists in the matter shown and described and set forth in the appended claims.

What is claimed is:

1. The combination with a push harvester and motor driven device for propelling the same, of a driving shaft on said device, transmission mechanism connecting the same to the driving wheels for propelling said wheels including a clutch member, transmission mechanism for turning said wheels about a central vertical axis adapted to be connected and disconnected from said driving shaft, and means for simultaneously connecting the same to the driving shaft and disengaging said clutch.

2. The combination with a push harvester and motor driven device for propelling the same comprising driven bull wheels, of a driving shaft for said device, transmission mechanism connecting the same to the bull wheels for turning the latter, including a clutch, a hand steering mechanism for turning said wheel about a central vertical axis, and power driven mechanism adapted to be connected to said drive shaft for turning said wheels about a vertical axis, and means for simultaneously disengaging said clutch, rendering the hand steering mechanism inoperative and connecting the said power driven means to the driving shaft.

3. The combination with a push harvester and a motor driven device for driving the same comprising a drive shaft on said device, reversible transmission mechanism for connecting said drive shaft to the bull wheels for turning the latter about a vertical axis, a hand steering means independent of said reversible mechanism for turning said wheels about a central vertical axis, and a single means for disconnecting said hand steering mechanism from said wheels and connecting said drive shaft to said reversible mechanism to turn said wheels in either direction.

4. The combination with a push harvester and a motor driven device for propelling the same, including driven bull wheels, of a drive shaft for said device, transmission mechanism connecting said drive shaft to said wheels for turning the same, including a clutch member interposed in said shaft, power driven means for turning said wheels about a central vertical axis in either direction adapted to be connected and disconnected from said drive shaft, and means comprising a single lever for disengaging said clutch and connecting said power driven means to said drive shaft.

5. The combination with a push harvester and motor driven device for propelling the same including driven bull wheels, of a drive shaft for said device, transmission mechanism connecting said shaft to the bull wheels for turning the same including a clutch member, a hand steering device for turning said wheels about a central longitudinal axis, power driven mechanism adapted to be connected and disconnected from said drive shaft for turning said wheels about a central vertical axis, and mechanism including a single lever for disengaging said clutch and rendering said hand steering mechanism inoperative and connecting or disconnecting said power driven mechanism to or from the drive shaft.

6. The combination with a push harvester and a motor driven device for propelling the same including driven bull wheels, of a drive shaft for said device, an axle connecting the said bull wheels, an axle housing mounted for horizontal swinging movement about a central vertical axis, and means for swinging said axle and housing about the central vertical axis including a horizontal gear disposed about the same, and a movable carriage carrying a gear in constant mesh with the gear on said drive shaft adapted to be movable longitudinally into various positions whereby the said axle and housing will be turned in one direction or the other, or will be disconnected from the drive shaft.

7. The combination with a push harvester and a motor driven device for propelling the same including driven bull wheels, of a drive shaft for said device, an axle connecting said wheels, an axle housing adapted to swing about a vertical central axis, and means for swinging said housing about a central vertical axis including a horizontal annular gear carried on the outer periphery thereof, a vertically disposed shaft, a gear on the lower end of the same meshing with said annular gear, a gear upon the upper end of the same, a longitudinally sliding carriage, gears journaled in said carriage and disposed at the outer side of said last mentioned gear, means for constantly connecting said two gears to the drive shaft, and means for sliding the carriage longitudinally to bring either of the gears carried therein into mesh with the said gear at the top of the vertical shaft.

8. A motor driven device for propelling a push harvester having in combination a motor driven drive shaft, a pair of bull wheels, an axle connecting the same, means for swinging said wheels and axle about a central longitudinal axis, said means being connected to the drive shaft and including an elongated gear carried thereon, a slidable gear carriage, a shaft mounted therein and having a comparatively narrow gear mounted therein arranged to continuously mesh with said elongated gear, oppositely disposed beveled gears secured to said last mentioned gear, horizontal beveled gears meshing with said oppositely disposed gears, and horizontal spur gears connected to said horizontal beveled gears, all of said gears, except said elongated gear, being adapted to be moved longitudinally with said carriage.

9. A motor driven device for a push harvester having in combination a pair of bull wheels, an axle connecting the same, an axle housing comprising an annular horizontal portion, an internal gear formed on said portion and connected to a hand steering mechanism to turn said housing and axles about a central longitudinal axis, and an external gear formed on said portion and connected to a power driven means for turning said housing about a central vertical axis.

10. A motor driven device for propelling a push harvester having in combination a motor driven shaft, a pair of bull wheels, an axle connecting the same, transmission means from said drive shaft to said wheels for turning the same about the axis of the axle, power driven means for swinging said wheel and axle about a central vertical axis adapted to be connected or disconnected from said drive shaft, and a single means for rendering the first mentioned means inoperative and connecting the last mentioned means to said drive shaft.

11. A motor driven device for propelling a push harvester having in combination a motor driven shaft, a pair of driving wheels, a driving axle connecting the same, means connected to the drive shaft for turning said wheels and axle about the longitudinal axis thereof to propel the same, a hand steering device for turning said wheels and axle about a central vertical axis, power driven means adapted to be connected and disconnected to said drive shaft for turning said wheels and axle about a central vertical axis, and a single means for simultaneously rendering said first mentioned means and the hand steering mechanism inoperative and connecting said power driven means to the drive shaft.

SWAN OLSON.